United States Patent
Tada

(10) Patent No.: US 8,314,995 B2
(45) Date of Patent: Nov. 20, 2012

(54) VARIABLE POWER OPTICAL SYSTEM AND IMAGING APPARATUS

(75) Inventor: Eijiroh Tada, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/233,378

(22) Filed: Sep. 15, 2011

(65) Prior Publication Data
US 2012/0075717 A1 Mar. 29, 2012

(30) Foreign Application Priority Data
Sep. 27, 2010 (JP) ................................ 2010-215642

(51) Int. Cl.
G02B 15/14 (2006.01)

(52) U.S. Cl. ....................................... 359/684; 359/689

(58) Field of Classification Search .................. 359/683, 359/684, 689, 708
See application file for complete search history.

(56) References Cited

U.S. PATENT DOCUMENTS
6,597,513 B2    7/2003 Minefuji

FOREIGN PATENT DOCUMENTS
| JP | 2004-247887 | 9/2004 |
|---|---|---|
| JP | 3709148 | 8/2005 |
| JP | 2007-52273 | 3/2007 |
| JP | 4191501 | 9/2008 |

OTHER PUBLICATIONS

U.S. Appl. No. 13/237,238 to Yutaka Takakubo, filed Sep. 20, 2011.

Primary Examiner — Jack Dinh
(74) Attorney, Agent, or Firm — Greenblum & Bernstein P.L.C.

(57) ABSTRACT

A variable power optical system, including a fixed negative first lens group, a second positive lens group and a third positive lens group, wherein the first lens group includes a deflecting element arranged to bend an optical path, and when d12w denotes a distance between an image side principal point of the first lens group and an object side principal point of the second lens group at a short focal length end, d12t denotes a distance between the image side principal point of the first lens group and the object side principal point of the second lens group at a long focal length end, fw denotes a focal length of the optical system at the short focal length end, ft denotes a focal length of the optical system at the long focal length end, and f1 denotes a focal length of the first lens group, the optical system satisfies:

$$2.5 < (d12w/d12t)/|\sqrt{fw \times ft}/f1| < 4.0.$$

20 Claims, 12 Drawing Sheets

VARIABLE POWER OPTICAL SYSTEM AND IMAGING APPARATUS

BACKGROUND OF THE INVENTION

The present invention relates to a variable power optical system for shooting an object, and to an imaging apparatus having the variable power optical system.

Recently, imaging apparatuses having a zooming function (e.g., digital cameras, digital video cameras and digital electronic devices in which an imaging module mounted) have become widespread. Incidentally, such digital electronic devices include a mobile phone, a PDA (Personal Digital Assistant), a PND (Portable Navigation Device), a PHS (Personal Handy phone System), a portable game machine and a notebook computer. In order to increase the degree of freedom in regard to portability and design of such cameras and digital electronic device, it is desirable that the variable power optical system mounted on an imaging apparatus is designed to be thin and compact in size.

Japanese Patent Publication No. 3709148B (hereafter, referred to as patent document #1) describes a variable power optical system of a retractable type including a negative lens group, a positive lens group and a positive lens group, i.e., three lens groups. The variable power optical system described in patent document #1 is configured such that all the lens groups are aligned along an axis. Therefore, it is difficult to reduce the size in the thickness direction of an apparatus. Hence, the variable power optical system is unsuitable for design for reducing the thickness of an apparatus.

Japanese Patent Provisional Publication No. 2007-052273A (hereafter, referred to as patent document #2) describes a variable power optical system configured such that an optical path is bent by arranging a right angle prism in a first lens group. The variable power optical system described in patent document #2 is a so-called bending optical system configured to bend an optical path so that the thickness of an apparatus can be reduced. Immediately after the right angle prism, a negative lens group which moves during focusing is arranged. The interval between the right angle prism and the negative lens group is designed to be relatively wide in consideration of a moving amount of a lens during near distance shooting and a clearance to avoid mechanical interference. However, as the interval between an exit surface of the right angle prism and the negative lens group increases, a height from the optical axis defined in the right angle prism with respect to a light ray proceeding to a peripheral part of an image during long distance shooting increases. Therefore, it is necessary to employ a right angle prism having a large size, which is unsuitable for design for reducing the thickness of an apparatus.

Japanese Patent Publication No. 4191501B (hereafter, referred to as patent document #3) describes a variable power optical system configured such that a second right angle prism is additionally arranged immediately before an image pickup chip. Since the variable power optical system described in patent document #3 is configured to bend an optical path at two points, i.e., a point immediately after an entrance position of light and a point immediately before an exit position of light, it appears that the variable power optical system is suitable for reducing the thickness and size of an apparatus. However, patent document #3 merely describes a general configuration of the variable power optical system. That is, no explanation is made in patent document #3 about a concrete configuration of the variable power optical system for reducing the thickness and the size of an apparatus.

SUMMARY OF THE INVENTION

The present invention is advantageous in that it provides a variable power optical system suitable for design for reducing the thickness and the size of an imaging apparatus, and an imaging apparatus in which such a variable power optical system is mounted.

According to an aspect of the invention, there is provided a variable power optical system, which includes a first lens group having a negative power, a second lens group having a positive power, and a third lens group having a positive power. The position of the first lens group is fixed with respect to an image pickup plane. The first, the second and the third lens groups are arranged in this order from an object side. The first lens group includes a first deflecting element arranged therein to bend an optical path. In this configuration, at least one lens group selected from the first to third lens groups excepting the first lens group are moved to perform changing of power or focusing. The first lens group includes a negative lens, a negative lens and a positive lens arranged in this order from the object side. The second lens group includes a positive lens and a negative lens arranged in this order from the object side. The third lens group includes a positive lens. When d12w (unit: mm) denotes a distance between an image side principal point of the first lens group and an object side principal point of the second lens group at a short focal length end, d12t (unit: mm) denotes a distance between the image side principal point of the first lens group and the object side principal point of the second lens group at a long focal length end, fw (unit: mm) denotes a focal length of the entire variable power optical system at the short focal length end, ft (unit: mm) denotes a focal length of the entire variable power optical system at the long focal length end, and f1 (unit: mm) denotes a focal length of the first lens group, the variable power optical system satisfies a condition:

$$2.5 < (d12w/d12t)/|\sqrt{fw \times ft}/f1| < 4.0 \quad (1).$$

With this configuration, it is possible to provide a variable power optical system suitable for design for reducing the thickness and the size of an imaging apparatus.

In at least one aspect, the variable power optical system may satisfy a condition:

$$0.7 < |f2n|/f2 < 1.0 \quad (2)$$

where f2n (unit: mm) denotes a focal length of the negative lens in the second lens group, and f2 (unit: mm) denotes a focal length of the second lens group.

In at least one aspect, the variable power optical system may satisfy a condition:

$$6 < f3/fw < 10 \quad (3).$$

where f3 (unit: mm) denotes a focal length of the third lens group.

In at least one aspect, the variable power optical system may satisfy a condition:

$$V2p > 70 \quad (4)$$

where V2p denotes Abbe number with respect to the d-line of the positive lens in the second lens group.

In at least one aspect, when Np denotes a refractive index at the d-line of the first deflecting prism in the first lens group G1 and fL1 (unit: mm) denotes a focal length of an object side part of the first lens group with respect to a deflection surface of the first deflecting element, the variable power optical system may satisfy a following condition:

$$0.7 < Np/|fL1/fw| < 1.0 \qquad (5).$$

In at least one aspect, the first deflecting element may be a prism.

In at least one aspect, the first deflecting element may bend the optical path by approximately 90°.

In at least one aspect, the variable power optical system may further include a second deflecting element which deflects light passed through the third lens group toward an image pickup device arranged at a predetermined position.

In at least one aspect, the second deflecting element may be a prism.

In at least one aspect, the second deflecting element may bend the optical path by approximately 90°.

According to another aspect of the invention, there is provided an imaging apparatus, which includes one of the above described variable power optical systems, and an image pickup device arranged such that a sensor surface of the image pickup device is positioned on an image plane of the variable power optical system.

Such a configuration makes it possible to reduce the thickness and the size of the imaging apparatus.

BRIEF DESCRIPTION OF THE ACCOMPANYING DRAWINGS

DETAILED DESCRIPTION OF THE EMBODIMENTS

Hereinafter, an embodiment according to the invention are described with reference to the accompanying drawings.

Figure 1:
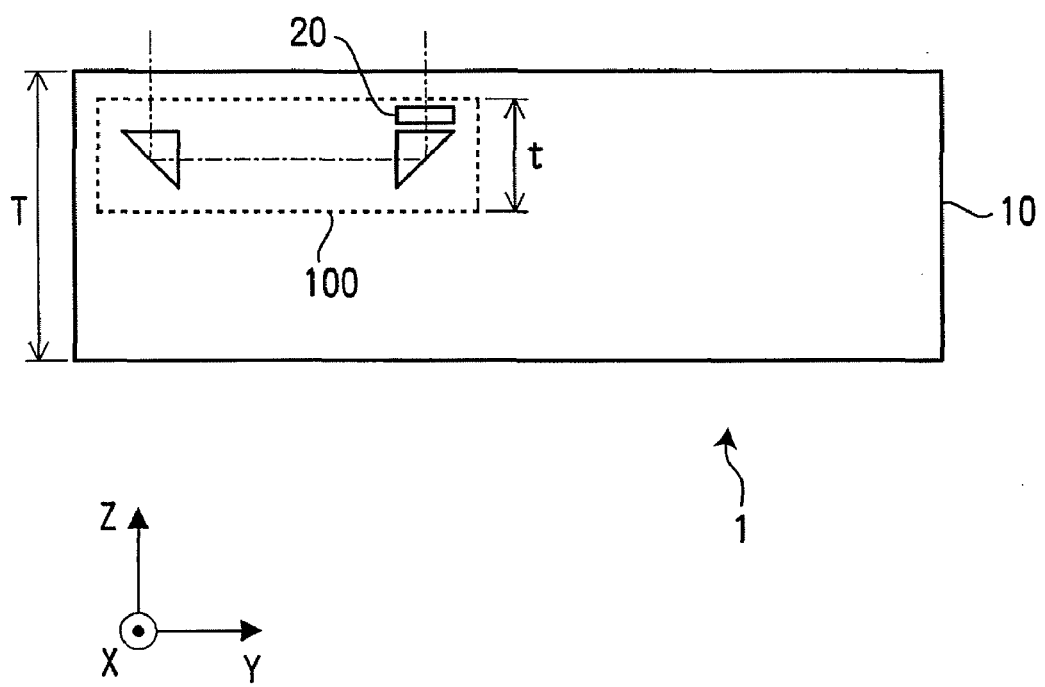
FIG. 1 illustrates a configuration of an imaging apparatus according to an embodiment of the invention.

FIG. 1 illustrates a configuration of an imaging apparatus 1 according to the embodiment of the invention. In FIG. 1, an optical configuration of the imaging apparatus 1 is generally illustrated, and a mechanical configuration and a circuit configuration which are not substantial parts of the embodiment are omitted for the sake of simplicity. In this embodiment, the imaging apparatus 1 is, for example, a mobile phone. However, in another embodiment, the imaging apparatus 1 may be a digital camera, a digital video camera or a digital electronic device in which an imaging module is mounted. Such a digital electronic device includes a mobile phone, PDA, PND, PHS, a portable game machine and a notebook computer. Alternatively, the imaging apparatus 1 may be an imaging module.

As shown in FIG. 1, the imaging apparatus 1 has a case 10 having the thickness T. In FIG. 1, the direction of the thickness T of the case 10 is defined as a Z axis direction, and two directions which are perpendicular to the Z axis direction and are perpendicular to each other are defined as a X axis direction (a direction perpendicular to a paper surface of FIG. 1) and a Y axis direction (a direction parallel with the paper surface of FIG. 1).

In a region surrounded by a dashed line in FIG. 1, a variable power optical system 100 is arranged. The variable power optical system 100 is a bending optical system configured to have a relatively long optical axis in the Y axis direction so as to reduce the thickness T (in Z axis direction) of the imaging apparatus 1. The variable power optical system 100 converges light from an object onto a sensor surface of an image pickup chip which is packaged in a resin package 20. The image pickup chip accumulates charges responsive to a light amount of an optical image at each pixel on the sensor surface, converts the charges to an image signal, and outputs the image signal to an image processing engine (not shown). The image processing engine processes the image signal to generate an image and to display the image on a screen or to store the image in a recording medium. The image pickup chip is, for example, a CCD (Charge Coupled Device) or a CMOS (Complementary Metal Oxide Semiconductor).

Figure 2:
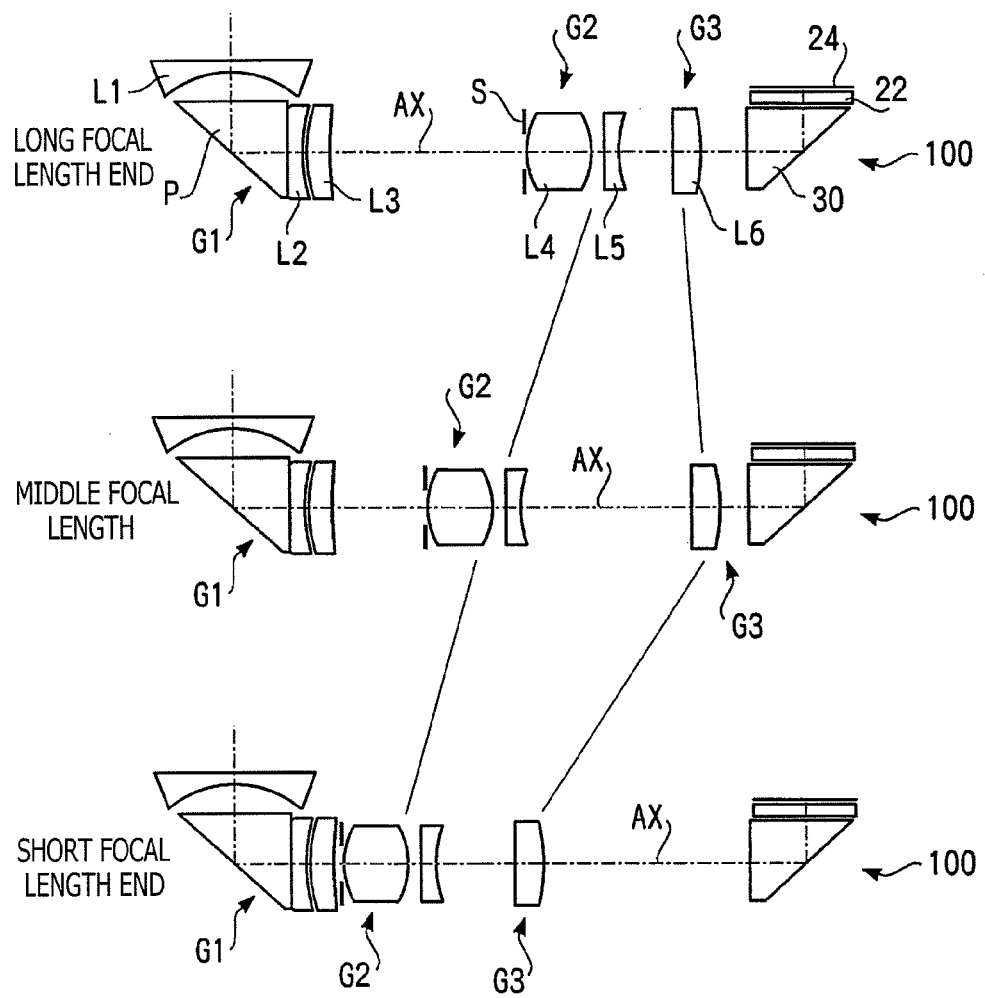
FIG. 2 is an explanatory illustration for explaining a configuration and a motion of the variable power optical system during changing of power.
Figure 2:
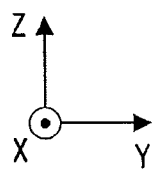

FIG. 2 is an explanatory illustration for explaining a configuration and a motion of the variable power optical system 100 during changing of power. As shown in FIG. 2, the variable power optical system 100 includes a negative first lens group G1, a positive second lens group G2 and a positive third lens group G3 arranged in this order from the object side. When the power is changed from the short focal length end to the long focal length end in the variable power optical system 100, the second and third lens groups G2 and G3 move. In this case, the position of the first lens group G1 remains unchanged regardless of change of power. More specifically, the second lens group G2 moves monotonously toward the object side in the direction of the optical axis AX while the power is changed from the short focal length end to the long focal length end. The third lens group G3 moves toward the image side in the direction of the optical axis AX within a range from the short focal length end to a middle focal length. Within a range from the middle focal length to the long focal length end, the third lens group G3 reverses its course and moves toward the object side in the direction of the optical axis AX. Focusing is performed by only moving the third lens group G3.

An aperture stop S is arranged between the first lens group G1 and the second lens group G2. The apertures stop S moves together with the second lens group G2. On the rear side of the variable power optical system 100, a deflecting prism 30 and the resin package 20 are arranged in this order. The deflecting prism 30 is, for example, a right angle prism which bends an optical path by 90°. In FIG. 2, a cover glass 22 and the sensor surface 24 are illustrated in place of the resin package for convenience of explanation. The cover glass 22 seals the image pickup chip adhered to the resin package 20. The sensor surface 24 of the image pickup chip is arranged on the image plane of the variable power optical system 100.

The first lens group G1 is a lens group having a negative power. The first lens group G1 includes a negative lens L1, a deflecting prism P, a negative lens L2 and a positive lens L3, which are arranged in this order from the object side. Each of the second lens group G2 and the third lens group G3 is a lens group having a positive power. The second lens group G2 includes a positive lens L4 and a negative lens L5 arranged in this order from the object side. The third lens group G3 includes a positive lens L6. It should be noted that each of the first to third lens groups G1 to G3 may include an optical component not illustrated in FIG. 1.

In order to reduce a mechanical load which would act on a mechanism of the variable power optical system 100 during a focusing motion, it is preferable that the third lens group G3 is configured by a single lens for weight saving. The single lens constituting the third lens group G3 is, for example, a positive planoconvex lens having a convex surface on the image side or a positive biconvex lens.

The deflecting prism P is, for example, a right angle prism configured to bend an optical path by 90°. Therefore, light incident on the negative lens L1 in the Z axis direction is bent by the deflecting prism P to the Y axis direction, and passes through the negative lens L2, the positive lens L3, the positive lens L4, the negative lens L5 and the positive lens L6 in this order. The light which has passed through the positive lens L6 is bent again by the deflecting prism 30 to the Z axis direction, and then is incident on the effective pixel area of the sensor surface 24 after passing through the cover glass 22.

The image pickup chip is arranged such that the sensor surface 24 is in parallel with the XY plane so as to let the light bent to the Z axis direction by the deflecting prism 30 be correctly incident on the effective pixel area of the sensor surface 24. By thus arranging the image pickup chip having a relatively large size in the sensor surface direction, it becomes possible to reduce the size t in the Z axis direction of a block including the variable power optical system 100 and the image pickup chip (the resin package 20). As a result, the thickness T of the case 10 can be reduced, and therefore the thickness of the imaging apparatus 1 can be reduced. Furthermore, since lenses constituting the variable power optical system 100 are aligned in two directions (Z axis direction and Y axis direction), the total length (in Y axis direction) of the variable power optical system 100 can be reduced, which is advantageous in regard to design for downsizing of the imaging apparatus 1.

In order to prevent increase of the size or the lens thickness of the lenses constituting the variable power optical system 100 while maintain the suitable optical performance, the variable power optical system 100 is configured to satisfy a following condition (1):

$$2.5 < (d12w/d12t)/|\sqrt{fw \times ft}/f1| < 4.0 \quad (1)$$

where d12w (unit: mm) denotes a distance between an image side principal point of the first lens group G1 and an object side principal point of the second lens group G2 at the short focal length end, d12t (unit: mm) denotes a distance between the image side principal point of the first lens group G1 and the object side principal point of the second lens group G2 at the long focal length end, fw (unit: mm) denotes the focal length of the entire variable power optical system 100 at the short focal length end, ft (unit: mm) denotes the focal length of the entire variable power optical system 100 at the long focal length end, and f1 (unit: mm) denotes the focal length of the first lens group G1.

When the intermediate term of the condition (1) gets larger than the upper limit of the condition (1), the moving length of the second lens group G2 during changing of power becomes long, and the peripheral light amount decreases because in this case light rays proceeding to the peripheral part of the effective pixel area of the sensor surface 24 are eclipsed. In order to prevent decrease of the peripheral light amount, it becomes necessary to design the first lens group G1 or the second lens group G2 to have a large diameter so as to take the peripheral light lays in the first lens group G1 or the second lens group G2. As a result, it becomes difficult to reduce the thickness and the size of the variable power optical system 100. When the intermediate term of the condition (1) gets smaller than the lower limit of the condition (1), the refractive power of each of the lens groups of the variable power optical system 100 becomes large, and thereby the aberrations are caused largely. Since it is necessary to increase the number of lenses to correct the aberrations, the situation where the intermediate term of the condition (1) is smaller than the lower limit of the condition (1) is disadvantageous in regard to reducing the thickness and the size of the variable power optical system 100.

The variable power optical system 100 may be configured to satisfy a following condition (2):

$$0.7 < |f2n|/f2 < 1.0 \quad (2)$$

where f2n (unit: mm) denotes the focal length of a negative lens (the negative lens L5 in the example shown in FIG. 2) in the second lens group G2, and f2 (unit: mm) denotes the focal length of the second lens group G2.

The condition (2) is a condition for suitably correcting the spherical aberration and a coma throughout the entire variable-power range, and for securing a space (i.e., a back focus) between the image plane and a backmost lens surface of the variable power optical system 100 while causing the incident angle of the light lay proceeding to the peripheral part of the effective pixel area of the sensor surface 24 with respect to the image plane to be close to a right angle. When the condition (2) is satisfied, an adequate back focus for arranging the deflecting prism 30 can be secured. When |f2n|/f2 gets larger than the upper limit of the condition (2), it becomes difficult to secure a back focus because in this case the refractive power of the negative lens L5 of the second lens group G2 becomes too small. When |f2n|/f2 gets smaller than the lower limit of the condition (2), Petzval sum becomes too large in a negative direction and the field curvature in an over direction is caused strongly. In this case, the correction of the field curvature is difficult, and the incident angle difference between upper and lower marginal light rays of the off-axis light beams becomes large. As a result, an off-axis coma is caused largely.

When f3 (unit: mm) denotes the focal length of the third lens group G3, the variable power optical system 100 may be configured to satisfy a condition (3):

$$6 < f3/fw < 10 \quad (3)$$

The condition (3) is a condition for securing a back focus while correcting the field curvature and astigmatism throughout the entire variable-power range. When f3/fw gets larger than the upper limit of the condition (3), the refractive power of the third lens group G3 becomes too week, and the moving amount of the third lens group G3 during the changing of power or the focusing becomes large, which is disadvantageous in regard to reducing of the thickness and the size of the variable power optical system 100. Furthermore, in this case, the function as a field lens is weakened, and therefore the incident angle of the light ray proceeding to the peripheral part of the effective pixel area of the sensor surface 24 with respect to the image plane becomes large. Since light rays exceeding the acceptable angle do not converge on the sensor surface 24, problems, such as decrease of contrast, are caused. When f3/fw gets smaller than the lower limit of the condition (3), the refractive power of the third lens group G3 becomes too strong, and therefore the field curvature is caused strongly in an under direction. In this case, correction for the filed curvature is difficult. Furthermore, the chromatic difference of magnification becomes large within a wide variable-power range. Since the back focus becomes short, it becomes difficult to arrange the deflecting prism 30.

In order to suitably correct the chromatic aberration, the variable power optical system 100 may be configured to satisfy a following condition (4):

$$V2p > 70 \quad (4)$$

where V2p denotes Abbe number with respect to the d-line of a positive lens (the positive lens L4 in the examples shown in FIG. 2) in the second lens group G2.

When V2p gets smaller than the lower limit of the condition (4), the chromatic aberration is caused largely in the second lens group G2, and therefore it becomes difficult to correct the fluctuation of the chromatic aberration occurring in accordance with changing of power.

When Np denotes the refractive index at the d-line of the deflecting prism (the deflecting prism P in the example of FIG. 2) in the first lens group G1 and fL1 (unit: mm) denotes the focal length of an object side part of the first lens group G1 with respect to a reflection surface (a reflection surface of the deflecting prism P in the example of FIG. 2) in the first lens group G1, the variable power optical system 100 may be configured to satisfy a following condition (5):

$$0.7 < Np/|fL1/fw| < 1.0 \quad (5).$$

When the condition (5) is satisfied, it becomes unnecessary to perform mirror vapor deposition for the reflection surface because in this case deterioration of the aberrations is suppressed and the normal light reflects totally from the reflection surface. As a result, it becomes possible to suitably avoid occurrence of stray light due to the mirror vapor deposition while maintaining the suitable optical performance. When the intermediate term of the condition (5) gets larger than the upper limit of the condition (5), a problem regarding deterioration of the chromatic difference of magnification arises because in this case it is difficult to select the material having a large Abbe number. Furthermore, a problem arises that the chromatic difference of magnification and the distortion deteriorate because in this case the refractive index of the first lens group G1 is too strong. When the intermediate term of the condition (5) gets smaller than the lower limit of the condition (5), it becomes impossible to let the normal light totally reflect from the reflection surface with a high degree of efficiency. As a result, it becomes necessary to perform a process, such as the mirror vapor deposition, for the reflection surface. However, if the mirror vapor deposition is performed, light rays not contributing to the normal image formation may reflect from the reflection surface even when the light rays are incident on the reflection surface at an incident angle smaller than the critical angle, and the light rays may appear on an image as a ghost or flare.

In order to reduce the thickness or the size of the variable power optical system 100 while maintaining the suitable optical performance, the variable power optical system 100 may include a lens having an aspherical shape. A shape of an aspherical surface is expressed by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), κ is a conical coefficient, and $A_4, A_6, \ldots$ represent aspherical coefficients larger than or equal to the fourth order. By employing an aspherical surface lens, it becomes possible to appropriately control the aberrations including the spherical aberration and a coma. Furthermore, when an aspherical surface is employed in the third lens group G3, the performance regarding the peripheral part of an image at the short focal length end and the close-up shooting performance defined when the shortest object distance is decreased can be further enhanced.

Hereafter, five concrete numerical examples (first to fifth examples) of the variable power optical system 100 mounted on the imaging apparatus 1 are explained.

First Example

Figure 3A:
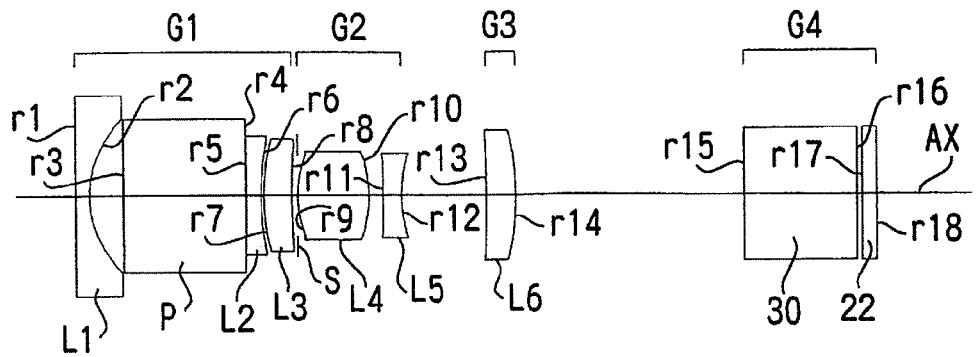
FIGS. 3A and 3B show a developed view of the variable power optical system according to a first example and downstream side optical components, in which an optical path of the variable power optical system is developed.
Figure 3B:
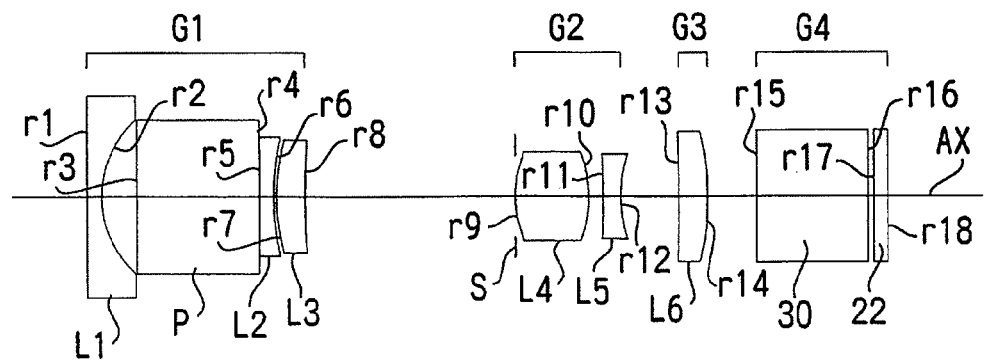

Each of FIGS. 3A and 3B is a developed view of the variable power optical system 100 according to a first example and optical components (hereafter, referred to as a fourth lens group G4 for convenience of explanation) arranged on the downstream side of the variable power optical system 100. In each of FIGS. 3A and 3B, an optical path of the variable power optical system 100 is developed. FIG. 3A illustrates a lens arrangement defined when the variable-power position is at the long focal length end, and FIG. 3B illustrates a lens arrangement defined when the variable-power position is at the short focal length end. As shown in FIGS. 3A and 3B, the first lens group G1 according to the first example includes a planoconcave negative lens L1 having a concave surface which is formed to face the image side and is formed as an aspherical surface, the deflecting prism P, a biconcave negative lens L2, and a positive meniscus lens L3 having a convex surface on the object side, which are arranged in this order from the object side. The second lens group G2 according to the first example includes a biconvex positive lens L4 and a biconcave negative lens L5 which are arranged in this order from the object side. The third lens group G3 according to the first example includes a planoconvex positive lens L6 having a convex surface on the image side. Each of lens surfaces of the second lens group G2 and the third lens group G3 has an aspherical shape.

Table 1 shows a numeric configuration (design values) of the variable power optical system 100 and the fourth lens group G4 according to the first example. In Table 1, "R" denotes the curvature radius (unit: mm) of each optical surface, "D" denotes the thickness of an optical component or the distance (unit: mm) from each optical surface to the next optical surface on the optical axis AX, "Nd" represents the refractive index at d-line (the wavelength of 588 nm), and vd represents Abbe number at d-line.

TABLE 1

| Surface No. | Curvature Radius R | Thickness · Distance D | Refractive Index Nd | Abbe Number |
|---|---|---|---|---|
| 1 | ********** | 0.500 | 1.58913 | 61.25 |
| 2 | 3.450 | 1.223 | | |
| 3 | ********** | 4.303 | 1.74400 | 44.90 |

TABLE 1-continued

| Surface No. | Curvature Radius R | Thickness · Distance D | Refractive Index Nd | Abbe Number |
|---|---|---|---|---|
| 4 | ********** | 0.038 | | |
| 5 | −56.809 | 0.500 | 1.77250 | 49.62 |
| 6 | 9.624 | 0.100 | | |
| 7 | 7.518 | 0.998 | 1.84666 | 23.78 |
| 8 | 27.936 | D 8 | | |
| 9 | 3.652 | 2.538 | 1.49700 | 81.61 |
| 10 | −4.384 | 0.512 | | |
| 11 | −98.729 | 0.626 | 1.60641 | 27.21 |
| 12 | 4.811 | D 12 | | |
| 13 | ********** | 1.030 | 1.54358 | 55.71 |
| 14 | −11.830 | D 14 | | |
| 15 | ********** | 4.000 | 1.74400 | 44.90 |
| 16 | ********** | 0.200 | | |
| 17 | ********** | 0.500 | 1.51680 | 64.20 |
| 18 | ********** | 0.200 | | |

The following Table 2 shows values which change depending on the variable-power position in the variable power optical system 100 according to the first example. Specifically, Table 2 shows the focal length (unit: mm) of the entire variable power optical system 100, F number, the half field angle (unit: degree), a group interval D8 (unit: mm), a group interval D12 (unit: mm) and a group interval D14 (unit: mm). The group interval D8 represents an interval between the first lens group G1 and the second lens group G2. The group interval D12 represents an interval between the second lens group G2 and the third lens group G3. The group interval D14 represents an interval between the third lens group G3 and the fourth lens group G4. In Table 2, values at the variable-power position equal to the short focal length end, values at the variable-power position equal to the middle focal length and values at the variable-power position equal to the long focal length end are illustrated in this order from the left side.

TABLE 2

| Focal Length f | 3.00 | 5.10 | 8.55 |
|---|---|---|---|
| Fno | 3.5 | 4.6 | 5.8 |
| Half Field Angle (deg) | 44.6 | 25.8 | 15.4 |
| D 8 | 7.467 | 3.934 | 0.199 |
| D 12 | 2.000 | 6.487 | 2.979 |
| D 14 | 1.756 | 0.802 | 8.044 |

Each aspherical surface of the variable power optical system 100 is configured to suitably correct the aberrations including the spherical aberration and a coma. Table 3 shows the conical coefficients κ and aspherical coefficients $A_4$, $A_6$ ... of each aspherical surface in the first example. In Table 3, the notation "E" means the power of 10 with an exponent specified by the number to the right of E (e.g. "E-04" means "$\times 10^{-4}$").

TABLE 3

| Surface No. | Conical Coefficient κ | A4 | A6 | A8 | A10 |
|---|---|---|---|---|---|
| 2 | 0.000 | −1.1894E−03 | −6.4623E−06 | −1.6614E−05 | 0.0000E+00 |
| 9 | 0.000 | −2.4657E−03 | −2.7308E−04 | −1.3194E−04 | 0.0000E+00 |
| 10 | 0.000 | 7.4043E−03 | −2.6441E−03 | 5.0486E−05 | 0.0000E+00 |
| 11 | 0.000 | 1.4645E−03 | −3.2565E−03 | −1.8870E−04 | 0.0000E+00 |
| 12 | 0.000 | 3.3898E−04 | −8.9082E−04 | −1.3632E−04 | 0.0000E+00 |
| 13 | 0.000 | −1.6818E−03 | −1.3073E−04 | 1.4445E−05 | 0.0000E+00 |
| 14 | 0.000 | −1.7021E−03 | −1.7383E−04 | 1.6983E−05 | 0.0000E+00 |

Figure 4A:
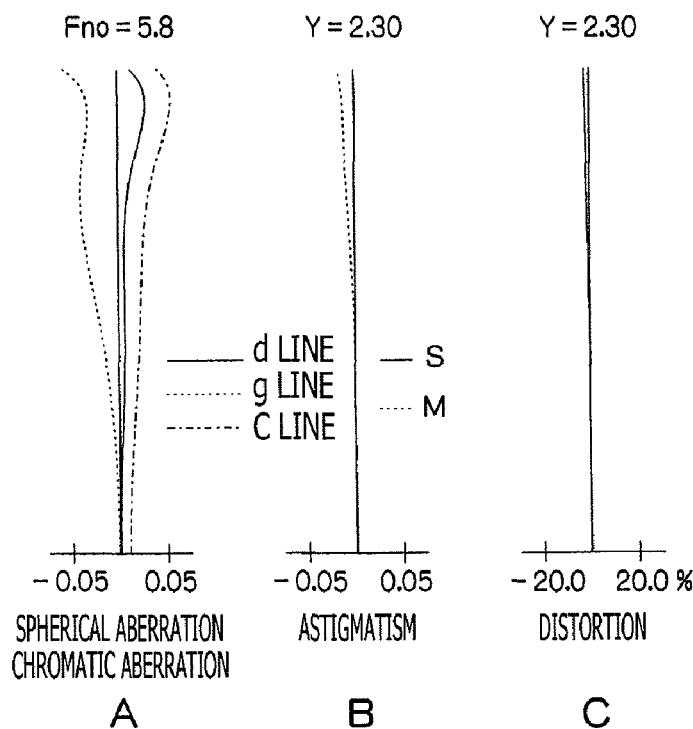
FIGS. 4A and 4B illustrate graphs of aberrations caused in the variable power optical system according to the first example.
Figure 4B:
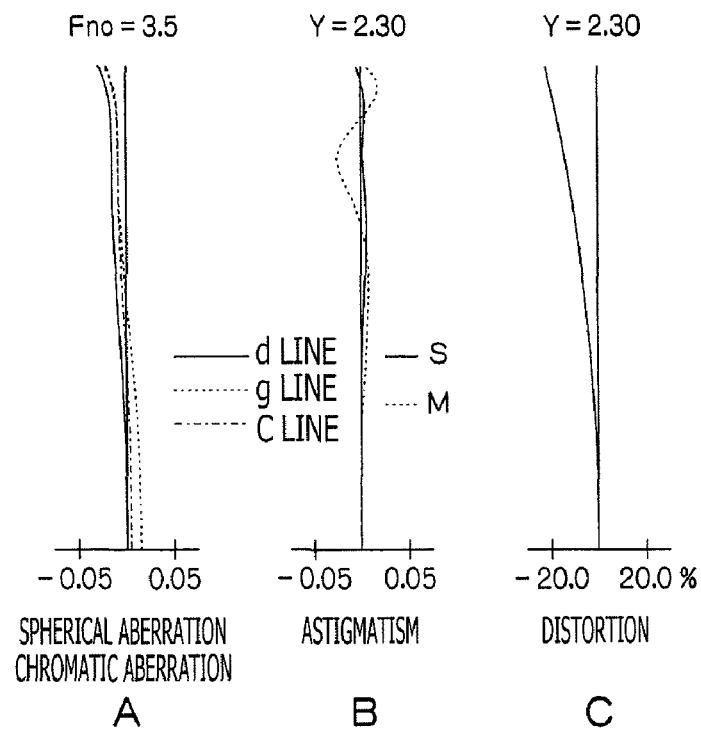

Each of FIGS. 4A and 4B illustrates graphs of the aberrations caused in the variable power optical system 100 according to the first example. Specifically, FIG. 4A illustrates the aberrations caused when the variable-power position is at the long focal length end, and FIG. 4B illustrates the aberrations caused when the variable-power position is at the short focal length end. In each of FIGS. 4A and 4B, the graph A shows the spherical aberration and the chromatic aberration at d-line (a curve indicated by a solid line), g-line (a curve indicated by a dotted line) and C-line (a curve indicated by a chain line). In each of FIGS. 4A and 4B, the graph B shows the astigmatism. In the graph B, a curve indicated by a solid line represents the sagittal component, and a curve indicated by a dotted line represents the meridional component. In each of FIGS. 4A and 4B, the graph C shows the distortion. In each of the graphs A and B, the vertical axis represents the image height, and the horizontal axis represents the amount of aberration. In the graph C, the vertical axis represents the image height, and the horizontal axis represents the distortion. The definitions regarding Tables and drawings of the first example are also applied to the following examples.

Second Example

Figure 5A:
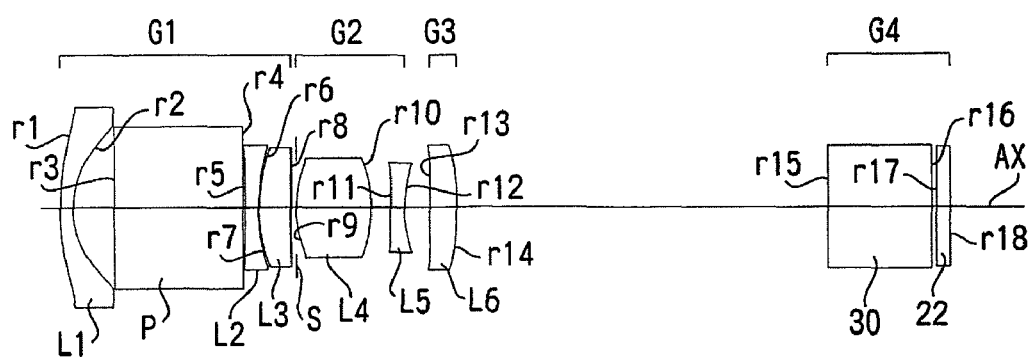
FIGS. 5A and 5B show a developed view of the variable power optical system according to a second example and downstream side optical components, in which an optical path of the variable power optical system is developed.
Figure 5B:
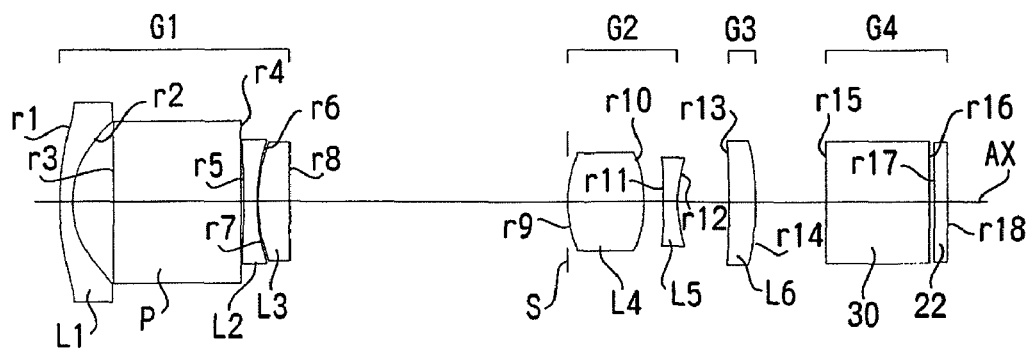
Figure 6A:
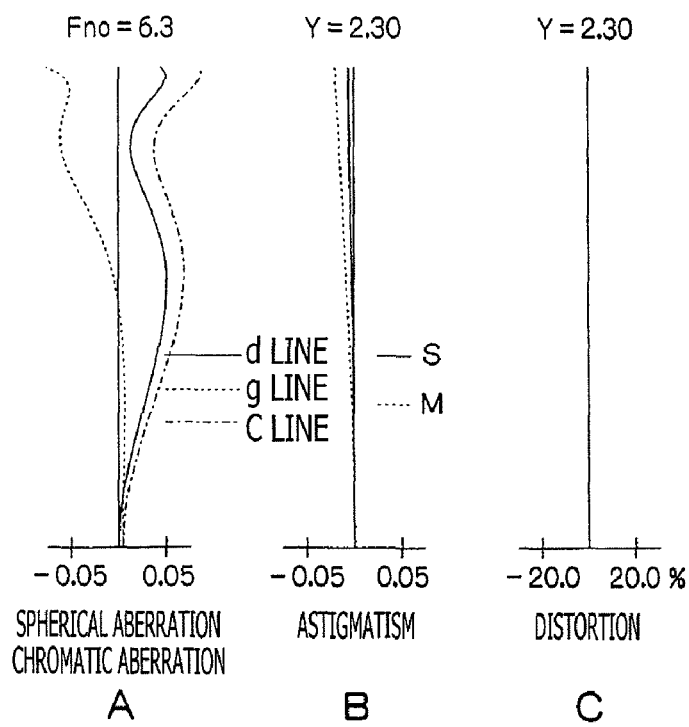
FIGS. 6A and 6B illustrate graphs of aberrations caused in the variable power optical system according to the second example.
Figure 6B:
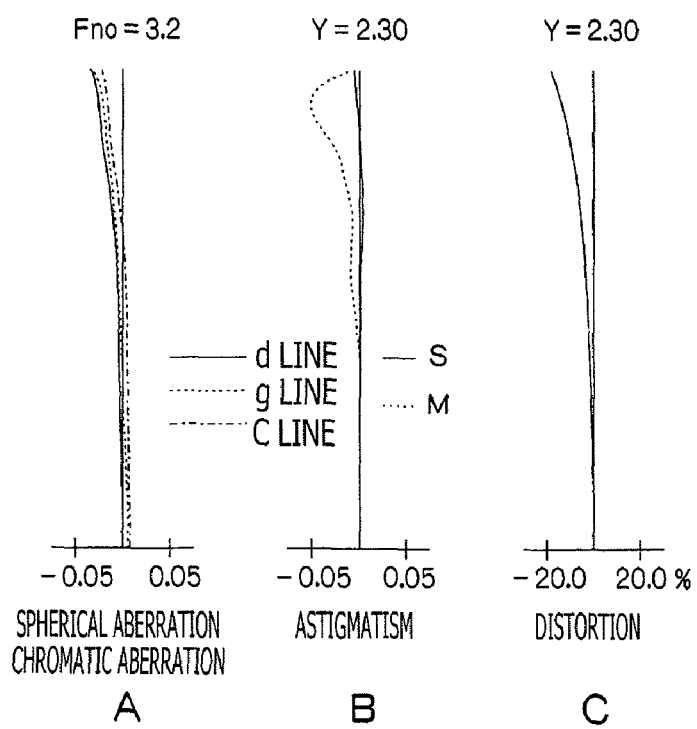

Each of FIGS. 5A and 5B is a developed view of the variable power optical system 100 according to a second example and the fourth group G4. In each of FIGS. 5A and 5B, an optical path is developed. Specifically, FIG. 5A illustrates the situation where the variable-power position is at the long focal length end, and FIG. 5B illustrates the situation where the variable-power position is at the short focal length end. Each of FIGS. 6A and 6B shows graphs of the aberrations caused in the variable power optical system 100 according to the second example. As shown in FIGS. 5A and 5B, the first lens group G1 according to the second example includes a negative meniscus lens L1 which has a convex surface on the object side, a deflecting prism P, a biconcave negative lens L2 and a positive meniscus lens L3 having a convex surface on the object side, which are arranged in this order from the object side. Both surfaces of the negative meniscus lens L1 are aspherical surfaces. The second lens group G2 according to the second example includes a biconvex positive lens L4 and a negative meniscus lens L5 having a convex surface on the object side, which are arranged in this order from the object side. The third lens group G3 according to the second example includes a planoconvex positive lens L6 having a convex surface on the image side. Each of lens surfaces of the second lens group G2 and the third lens group G3 has an aspherical shape.

Table 4 shows a numeric configuration (design values) of the variable power optical system 100 and the fourth group G4 according to the second example. Table 5 shows values which change depending on the variable-power position in the variable power optical system 100 according to the second example. Table 6 shows the conical coefficients κ and aspherical coefficients $A_4, A_6 \ldots$ of each aspherical surface in the second example.

TABLE 4

| Surface No. | Curvature Radius R | Thickness · Distance D | Refractive Index Nd | Abbe Number |
|---|---|---|---|---|
| 1 | 12.920 | 0.500 | 1.77250 | 49.62 |
| 2 | 3.662 | 1.604 | | |
| 3 | ********** | 5.000 | 1.74400 | 44.90 |
| 4 | ********** | 0.100 | | |
| 5 | −45.320 | 0.500 | 1.69680 | 55.46 |
| 6 | 7.172 | 0.050 | | |
| 7 | 6.270 | 1.228 | 1.60641 | 27.21 |
| 8 | 173.378 | D 8 | | |
| 9 | 4.261 | 2.951 | 1.49700 | 81.61 |
| 10 | −5.481 | 0.738 | | |
| 11 | 40.381 | 0.555 | 1.60641 | 27.21 |
| 12 | 4.664 | D 12 | | |
| 13 | ********** | 1.026 | 1.54358 | 55.71 |
| 14 | −13.486 | D 14 | | |
| 15 | ********** | 4.000 | 1.74400 | 44.90 |
| 16 | ********** | 0.200 | | |
| 17 | ********** | 0.500 | 1.51680 | 64.20 |
| 18 | ********** | 0.200 | | |

TABLE 5

| Focal Length f | 2.95 | 5.80 | 11.39 |
|---|---|---|---|
| Fno | 3.2 | 4.7 | 6.3 |
| Half Field Angle (deg) | 43.6 | 22.1 | 11.5 |
| D 8 | 10.880 | 5.391 | 0.199 |
| D 12 | 2.000 | 8.563 | 0.989 |
| D 14 | 2.770 | 1.696 | 14.463 |

TABLE 6

| Surface No. | Conical Coefficient κ | A4 | A6 | A8 | A10 |
|---|---|---|---|---|---|
| 1 | 0.000 | 2.8425E−03 | −2.7013E−04 | 4.9873E−06 | 0.0000E+00 |
| 2 | 0.000 | 2.7725E−03 | −1.4302E−04 | −3.7984E−05 | 0.0000E+00 |
| 8 | 0.000 | −2.5452E−04 | −7.3739E−06 | 6.9607E−06 | −1.2672E−08 |
| 9 | 0.000 | −1.5592E−03 | −3.8011E−04 | 1.7849E−05 | −1.2437E−05 |
| 10 | 0.000 | 4.1708E−03 | −2.8085E−03 | 4.1006E−04 | −3.0827E−05 |
| 11 | 0.000 | 6.9760E−04 | −6.4036E−03 | 1.0621E−03 | −5.3964E−05 |
| 12 | 0.000 | −9.6122E−05 | −4.3360E−03 | 9.1194E−04 | −4.6606E−05 |
| 13 | 0.000 | −2.6258E−03 | 4.8003E−04 | −1.1786E−04 | 5.9884E−06 |
| 14 | 0.000 | −2.3044E−03 | 2.4073E−04 | −5.5911E−05 | 1.5908E−06 |

Third Example

Figure 7A:
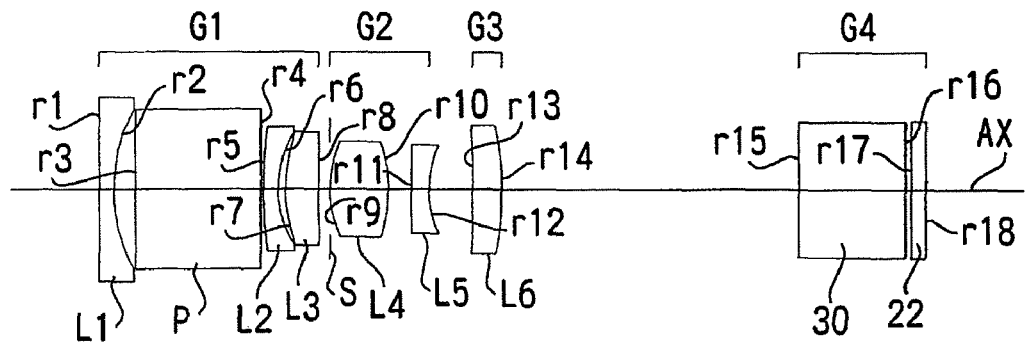
FIGS. 7A and 7B show a developed view of the variable power optical system according to a third example and downstream side optical components, in which an optical path of the variable power optical system is developed.
Figure 7B:
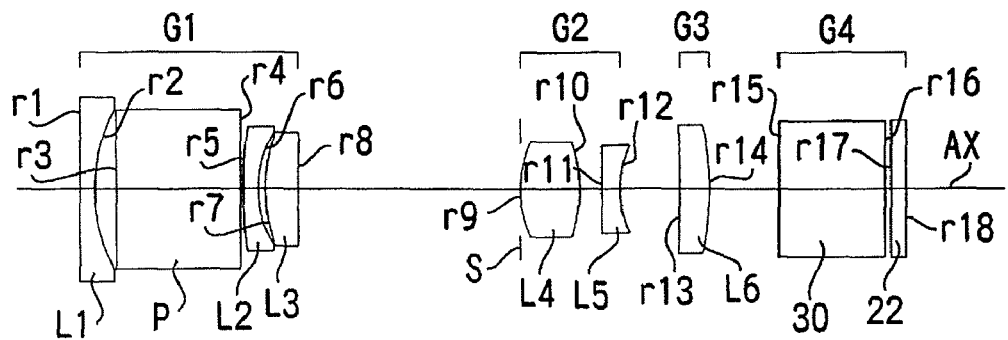
Figure 8A:
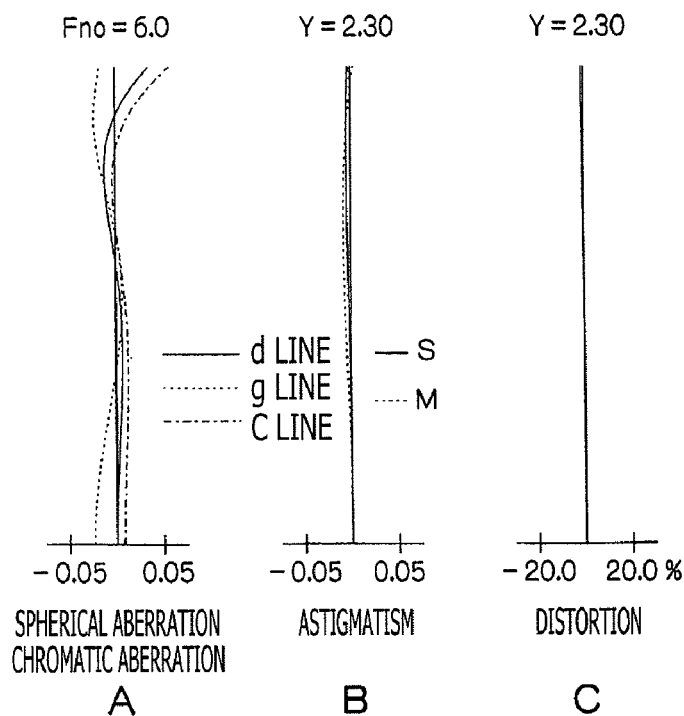
FIGS. 8A and 8B illustrate graphs of aberrations caused in the variable power optical system according to the third example.
Figure 8B:
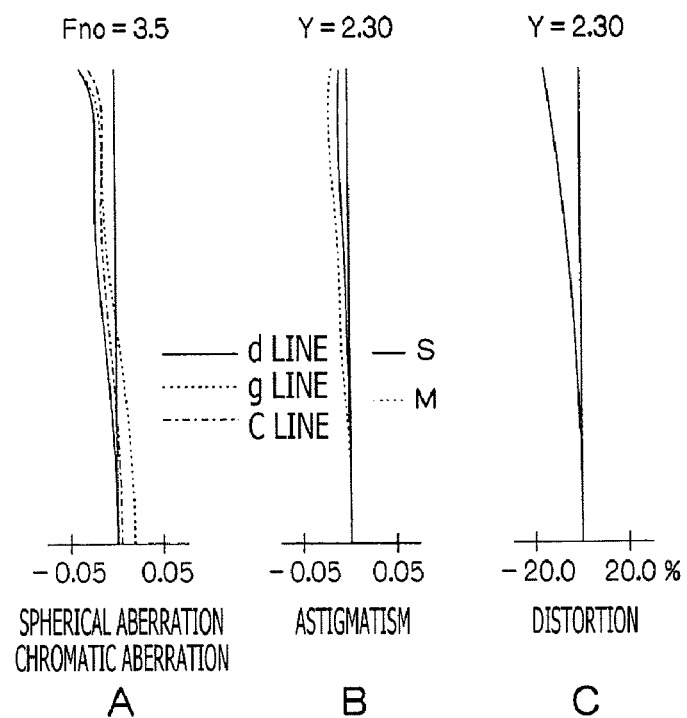

Each of FIGS. 7A and 7B is a developed view of the variable power optical system 100 according to a third example and the fourth group G4. In each of FIGS. 7A and 7B, an optical path is developed. Specifically, FIG. 7A illustrates the situation where the variable-power position is at the long focal length end, and FIG. 7B illustrates the situation where the variable-power position is at the short focal length end. Each of FIGS. 8A and 8B shows graphs of the aberrations caused in the variable power optical system 100 according to the third example. As shown in FIGS. 7A and 7B, the first lens group G1 according to the third example includes a planoconcave negative lens L1 having a concave surface on the image side, a deflecting prism P, a negative Meniscus lens L2 having a convex surface on the object side and a positive meniscus lens L3, which are arranged in this order from the object side. Both surfaces of the negative meniscus lens L2 are aspherical surfaces. The second lens group G2 according to the third example includes a biconvex positive lens L4 and a negative meniscus lens L5 having a convex surface on the object side, which are arranged in this order from the object side. The third lens group G3 according to the third example includes a planoconvex positive lens L6 having a convex surface on the image side. Each of lens surfaces of the second lens group G2 and the third lens group G3 has an aspherical shape.

Table 7 shows a numeric configuration (design values) of the variable power optical system 100 and the fourth group G4 according to the third example. Table 8 shows values which change depending on the variable-power position in the variable power optical system 100 according to the third example. Table 9 shows the conical coefficients κ and aspherical coefficients $A_4, A_6 \ldots$ of each aspherical surface in the third example.

TABLE 7

| Surface No. | Curvature Radius R | Thickness · Distance D | Refractive Index Nd | Abbe Number |
|---|---|---|---|---|
| 1 | ********** | 0.500 | 1.77250 | 49.62 |
| 2 | 5.620 | 0.730 | | |
| 3 | ********** | 4.270 | 1.74400 | 44.90 |
| 4 | ********** | 0.100 | | |
| 5 | 39.000 | 0.500 | 1.54358 | 55.71 |
| 6 | 3.650 | 0.230 | | |
| 7 | 4.200 | 1.130 | 1.60641 | 27.21 |
| 8 | 19.440 | D 8 | | |
| 9 | 3.455 | 2.000 | 1.49710 | 81.56 |
| 10 | −4.695 | 0.760 | | |
| 11 | 55.630 | 0.600 | 1.60641 | 27.21 |
| 12 | 3.550 | D 12 | | |

TABLE 7-continued

| Surface No. | Curvature Radius R | Thickness · Distance D | Refractive Index Nd | Abbe Number |
|---|---|---|---|---|
| 13 | ********** | 1.000 | 1.54358 | 55.71 |
| 14 | −12.730 | D 14 | | |
| 15 | ********** | 3.600 | 1.74400 | 44.90 |
| 16 | ********** | 0.200 | | |
| 17 | ********** | 0.500 | 1.51680 | 64.20 |
| 18 | ********** | 0.200 | | |

TABLE 8

| Focal Length f | 3.70 | 6.20 | 10.50 |
|---|---|---|---|
| Fno | 3.5 | 4.7 | 6.0 |
| Half Field Angle (deg) | 36.3 | 21.3 | 12.5 |
| D 8 | 7.536 | 3.882 | 0.399 |
| D 12 | 2.001 | 5.537 | 1.492 |
| D 14 | 2.351 | 2.468 | 9.996 |

TABLE 9

| Surface No. | Conical Coefficient κ | A4 | A6 | A8 | A10 |
|---|---|---|---|---|---|
| 5 | 0.000 | 5.8510E−03 | −4.1240E−04 | −1.2820E−05 | 0.0000E+00 |
| 6 | 0.000 | −6.4940E−03 | 3.1350E−03 | −3.4970E−04 | 0.0000E+00 |
| 7 | 0.000 | −1.4605E−02 | 2.5750E−03 | −2.8670E−04 | 0.0000E+00 |
| 8 | 0.000 | −5.4920E−03 | −1.5030E−04 | −4.4900E−05 | 0.0000E+00 |
| 9 | 0.000 | −2.8410E−03 | −2.5630E−04 | −1.3860E−04 | 0.0000E+00 |
| 10 | 0.000 | 6.9980E−03 | −1.9020E−03 | 7.7290E−05 | 0.0000E+00 |
| 11 | 0.000 | 1.5530E−03 | −3.4710E−03 | 5.4900E−04 | 0.0000E+00 |
| 12 | 0.000 | −1.7000E−04 | −1.4120E−03 | 4.6150E−04 | 0.0000E+00 |
| 13 | 0.000 | −1.6800E−03 | 1.0580E−05 | −5.9690E−05 | 0.0000E+00 |
| 14 | 0.000 | −1.7950E−03 | 6.9030E−06 | −4.7680E−05 | 0.0000E+00 |

Fourth Example

Figure 9A:
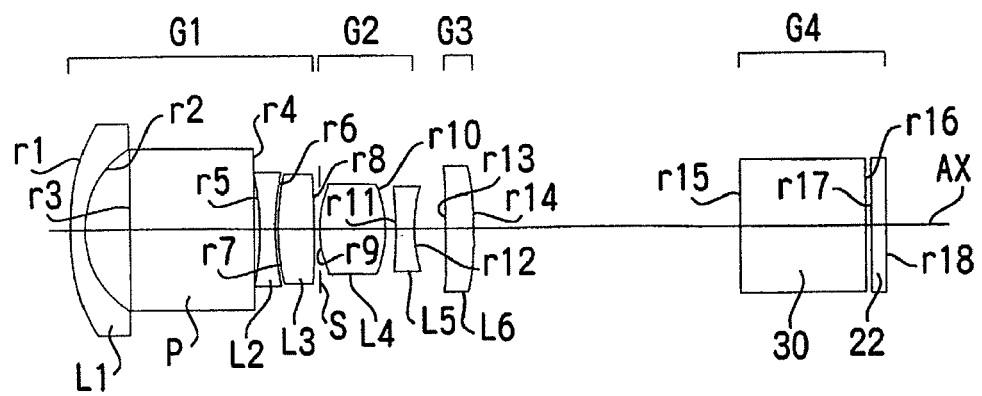
FIGS. 9A and 9B show a developed view of the variable power optical system according to a fourth example and downstream side optical components, in which an optical path of the variable power optical system is developed.
Figure 9B:
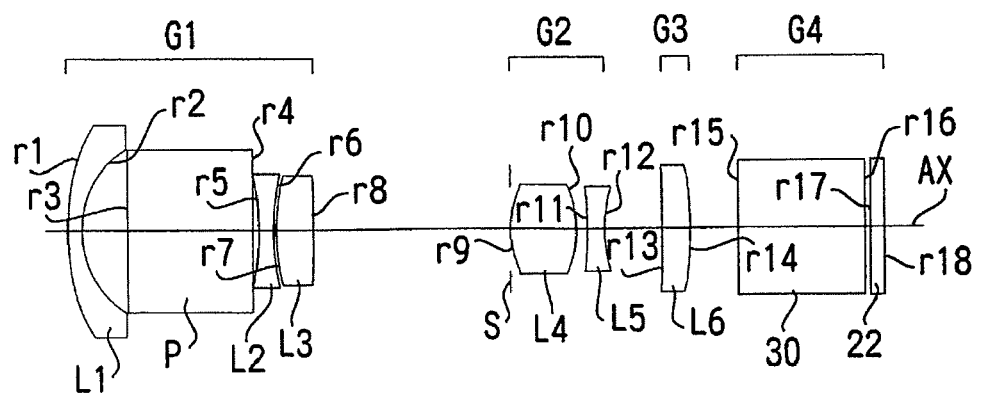
Figure 10A:
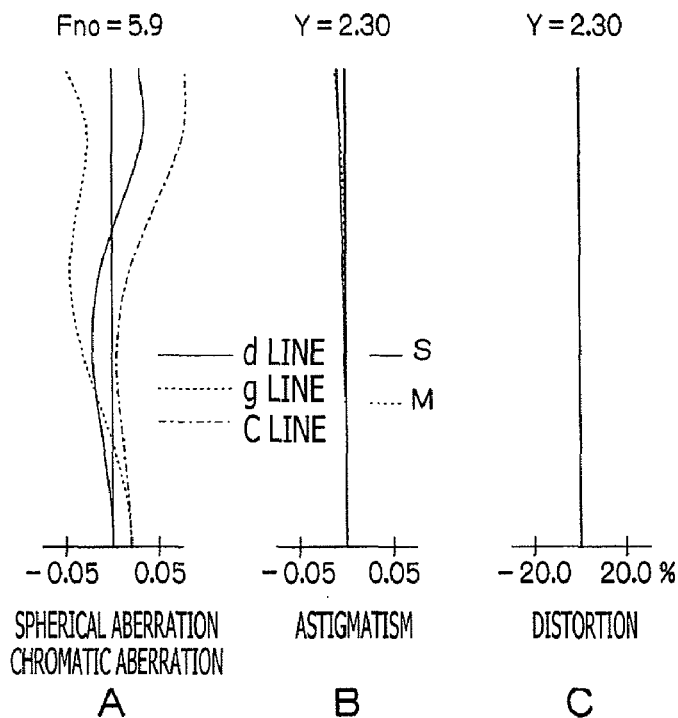
FIGS. 10A and 10B illustrate graphs of aberrations caused in the variable power optical system according to the fourth example.
Figure 10B:
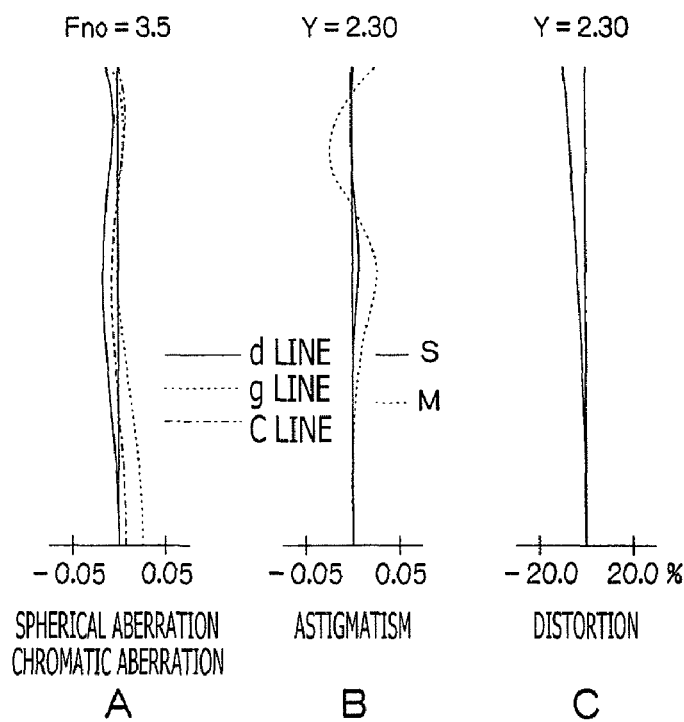

Each of FIGS. 9A and 9B is a developed view of the variable power optical system 100 according to a fourth example and the fourth group G4. In each of FIGS. 9A and 9B, an optical path is developed. Specifically, FIG. 9A illustrates the situation where the variable-power position is at the long focal length end, and FIG. 9B illustrates the situation where the variable-power position is at the short focal length end. Each of FIGS. 10A and 10B shows graphs of the aberrations caused in the variable power optical system 100 according to the fourth example. As shown in FIGS. 9A and 9B, the first lens group G1 according to the fourth example includes a negative meniscus lens L1 having a convex surface on the object side, a deflecting prism P, a biconcave negative lens L2 and a biconvex positive lens L3, which are arranged in this order from the object side. The convex surface of the negative meniscus lens L1 is formed to be an asphericla surface. The second lens group G2 according to the fourth example includes a biconvex positive lens L4 and a biconcave negative lens L5 which are arranged in the order from the object side. The third lens group G3 according to the fourth example includes a planoconvex positive lens L6 having a convex surface on the image side.

Table 10 shows a numeric configuration (design values) of the variable power optical system 100 and the fourth group G4 according to the fourth example. Table 11 shows values which change depending on the variable-power position in the variable power optical system 100 according to the fourth example. Table 12 shows the conical coefficients κ and aspherical coefficients $A_4, A_6 \ldots$ of each aspherical surface in the fourth example.

TABLE 10

| Surface No. | Curvature Radius R | Thickness · Distance D | Refractive Index Nd | Abbe Number |
|---|---|---|---|---|
| 1 | 10.142 | 0.500 | 1.75501 | 51.16 |
| 2 | 3.496 | 1.589 | | |
| 3 | ********** | 4.315 | 1.74400 | 44.90 |
| 4 | ********** | 0.205 | | |
| 5 | −9.300 | 0.500 | 1.77250 | 49.62 |
| 6 | 8.952 | 0.100 | | |
| 7 | 8.017 | 1.301 | 1.80518 | 25.46 |

TABLE 10-continued

| Surface No. | Curvature Radius R | Thickness · Distance D | Refractive Index Nd | Abbe Number |
|---|---|---|---|---|
| 8 | −43.173 | D 8 | | |
| 9 | 3.240 | 2.263 | 1.48749 | 70.44 |
| 10 | −3.586 | 0.359 | | |
| 11 | −16.668 | 0.592 | 1.60641 | 27.21 |
| 12 | 4.827 | D 12 | | |
| 13 | ********** | 0.963 | 1.54358 | 55.71 |
| 14 | −15.013 | D 14 | | |
| 15 | ********** | 4.423 | 1.74400 | 44.90 |
| 16 | ********** | 0.200 | | |
| 17 | ********** | 0.500 | 1.51680 | 64.20 |
| 18 | ********** | 0.200 | | |

TABLE 11

| Focal Length f | 3.00 | 5.10 | 8.55 |
|---|---|---|---|
| Fno | 3.5 | 4.7 | 5.9 |
| Half Field Angle (deg) | 40.4 | 25.0 | 15.2 |
| D 8 | 6.755 | 3.344 | 0.200 |
| D 12 | 2.000 | 5.943 | 1.066 |
| D 14 | 1.668 | 1.135 | 9.157 |

TABLE 12

| Surface No. | Conical Coefficient κ | A4 | A6 | A8 | A10 |
|---|---|---|---|---|---|
| 1 | 0.000 | 3.5401E−01 | −8.5340E−02 | 0.0000E+00 | 0.0000E+00 |
| 2 | 0.000 | 1.1175E−01 | 5.3470E−02 | 0.0000E+00 | 0.0000E+00 |

TABLE 12-continued

| Surface No. | Conical Coefficient κ | A4 | A6 | A8 | A10 |
|---|---|---|---|---|---|
| 9 | 0.000 | −1.3890E−02 | −2.4400E−03 | −4.4400E−03 | 0.0000E+00 |
| 10 | 0.000 | 6.8230E−02 | −6.5370E−02 | 1.8660E−02 | 0.0000E+00 |
| 11 | 0.000 | 1.5300E−02 | −7.1320E−02 | 3.4940E−02 | 0.0000E+00 |
| 12 | 0.000 | 3.7000E−04 | −2.1750E−02 | 2.1180E−02 | 0.0000E+00 |
| 13 | 0.000 | −1.0490E−02 | −1.3140E−02 | −2.5710E−02 | 0.0000E+00 |
| 14 | 0.000 | −1.0410E−02 | −1.8240E−02 | −2.9250E−02 | 0.0000E+00 |

Fifth Example

Figure 11A:
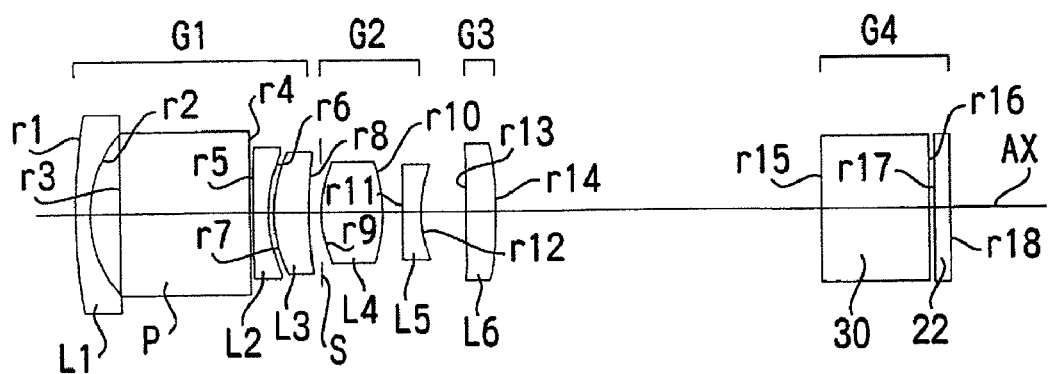
FIGS. 11A and 11B show a developed view of the variable power optical system according to a fifth example and downstream side optical components, in which an optical path of the variable power optical system is developed.
Figure 11B:
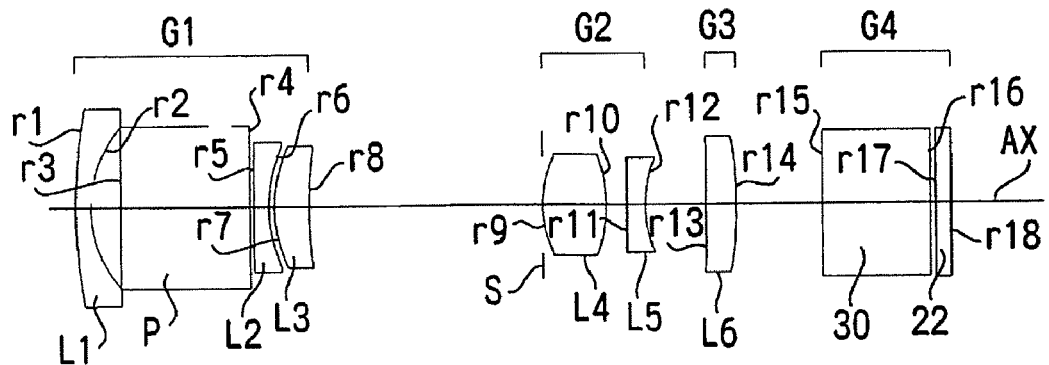
Figure 12A:
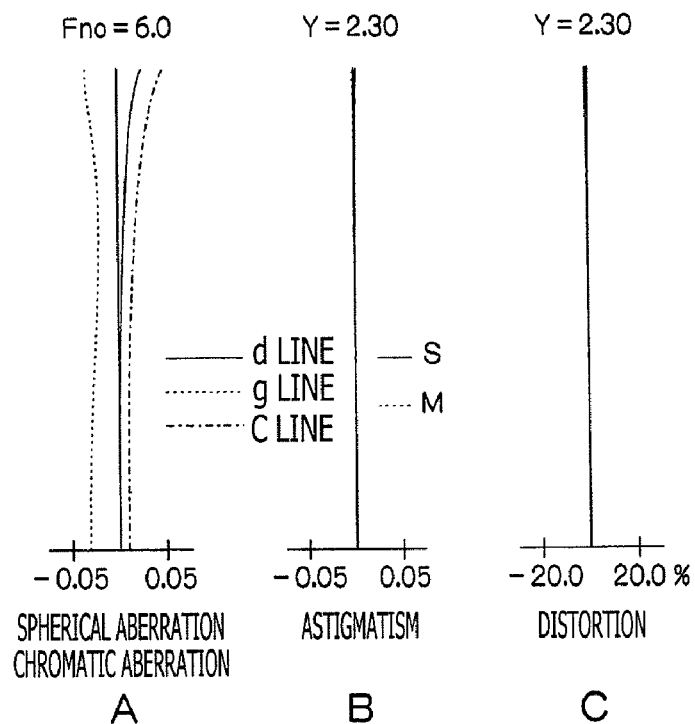
FIGS. 12A and 12B illustrate graphs of aberrations caused in the variable power optical system according to the fifth example.
Figure 12B:
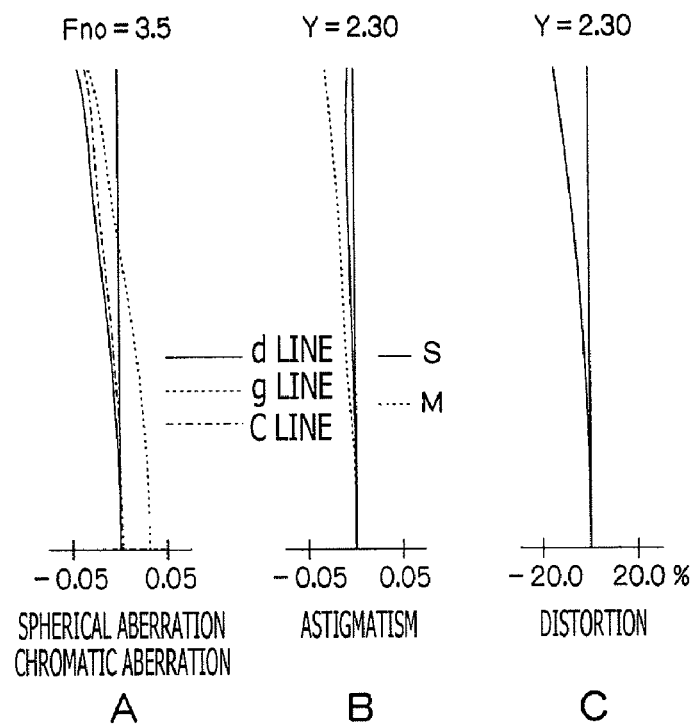

Each of FIGS. 11A and 11B is a developed view of the variable power optical system 100 according to a fifth example and the fourth group G4. In each of FIGS. 11A and 11B, an optical path is developed. Specifically, FIG. 11A illustrates the situation where the variable-power position is at the long focal length end, and FIG. 11B illustrates the situation where the variable-power position is at the short focal length end. Each of FIGS. 12A and 12B shows graphs of the aberrations caused in the variable power optical system 100 according to the fifth example. As shown in FIGS. 11A and 11B, the first lens group G1 according to the fifth example includes a negative meniscus lens L1 having a convex surface on the object side, a deflecting prism P, a negative meniscus lens L2 having a convex surface on the object side and a positive meniscus lens L3, which are arranged in this order from the object side. Both of surfaces of the negative meniscus lens L2 are aspherical surfaces. The second lens group G2 according to the fifth example includes a biconvex positive lens L4 and a biconcave negative lens L5 arranged in this order from the object side. The third lens group G3 according to the fifth example includes a biconvex positive lens L6. Each of lens surfaces of the second lens group G2 and the third lens group G3 has an aspherical shape.

Table 13 shows a numeric configuration (design values) of the variable power optical system 100 and the fourth group G4 according to the fifth example. Table 14 shows values which change depending on the variable-power position in the variable power optical system 100 according to the fifth example. Table 15 shows the conical coefficients κ and aspherical coefficients $A_4, A_6 \ldots$ of each aspherical surface in the fifth example.

TABLE 13

| Surface No. | Curvature Radius R | Thickness · Distance D | Refractive Index Nd | Abbe Number |
|---|---|---|---|---|
| 1 | 17.473 | 0.500 | 1.77250 | 49.62 |
| 2 | 3.997 | 1.012 | | |
| 3 | ********** | 4.270 | 1.74400 | 44.90 |
| 4 | ********** | 0.100 | | |
| 5 | 321.565 | 0.500 | 1.54358 | 55.71 |
| 6 | 4.198 | 0.180 | | |
| 7 | 3.959 | 1.150 | 1.60641 | 27.21 |
| 8 | 15.445 | D8 | | |
| 9 | 3.650 | 2.100 | 1.49710 | 81.56 |
| 10 | −4.627 | 0.670 | | |
| 11 | −301.579 | 0.600 | 1.60641 | 27.21 |
| 12 | 4.091 | D12 | | |
| 13 | 80.312 | 1.000 | 1.54358 | 55.71 |
| 14 | −16.337 | D14 | | |
| 15 | ********** | 3.600 | 1.74400 | 44.90 |
| 16 | ********** | 0.200 | | |
| 17 | ********** | 0.500 | 1.51680 | 64.20 |
| 18 | ********** | 0.200 | | |

TABLE 14

| Focal Length f | 3.70 | 6.20 | 10.50 |
|---|---|---|---|
| Fno | 3.5 | 4.6 | 6.0 |
| Half Field Angle (deg) | 35.4 | 21.2 | 12.5 |
| D 8 | 6.755 | 3.344 | 0.200 |
| D 12 | 2.000 | 5.943 | 1.066 |
| D 14 | 1.668 | 1.135 | 9.157 |

TABLE 15

| Surface No. | Conical Coefficient κ | A4 | A6 | A8 | A10 |
|---|---|---|---|---|---|
| 5 | 0.000 | 9.6143E−04 | −4.7179E−05 | 8.9782E−06 | 0.0000E+00 |
| 6 | 0.000 | −8.9037E−03 | 1.6338E−03 | −1.8207E−04 | 0.0000E+00 |
| 7 | 0.000 | −8.6967E−03 | 1.5547E−03 | −1.6567E−04 | 0.0000E+00 |
| 8 | 0.000 | −5.0174E−04 | 2.4925E−04 | −1.4678E−05 | 0.0000E+00 |
| 9 | 0.000 | −2.5063E−03 | −1.8663E−04 | −1.0509E−04 | 0.0000E+00 |
| 10 | 0.000 | 6.8024E−03 | −1.6970E−03 | 1.0357E−04 | 0.0000E+00 |
| 11 | 0.000 | 1.5959E−03 | −2.6093E−03 | 5.2615E−04 | 0.0000E+00 |
| 12 | 0.000 | 4.6014E−06 | −9.5348E−04 | 4.8144E−04 | 0.0000E+00 |
| 13 | 0.000 | −3.7167E−04 | −3.2711E−04 | −5.9974E−06 | 0.0000E+00 |
| 14 | 0.000 | −5.9172E−04 | −2.4253E−04 | −1.3547E−05 | 0.0000E+00 |

The following Table 16 shoes values of the conditions (1) to (5) calculated for each of the first to fifth examples. As shown in Table 16, the variable power optical system 100 according to each of the first to fifth examples satisfies all the condition (1) to (5). Therefore, the variable power optical system 100 according to each of the first to fifth examples is able to suitably correct the aberrations at each of the long focal length end and the short focal length end as shown in the above mentioned aberration graphs while configuring the variable power optical system 100 to be thin and compact in size. Since the variable power optical system 100 is configured to be thin and compact in size, the degree of freedom in regard to portability and design of the imaging apparatus 1 can be enhanced.

TABLE 16

| Condition | Lower Limit | Upper Limit | 1$^{st}$ Example | 2$^{nd}$ Example | 3$^{rd}$ Example |
|---|---|---|---|---|---|
| (1) (d12w/d12t)/|{(fw*ft)^½}/f1| | 2.5 | 4.0 | 3.18 | 3.72 | 3.53 |
| (2) |f2n|/f2 | 0.8 | 1.2 | 1.11 | 1.07 | 0.90 |
| (3) f3/fw | 6.0 | 10.0 | 7.25 | 8.41 | 6.33 |
| (4) V2p | 70 | — | 81.6 | 81.6 | 81.6 |
| (5) Np/|fL1/fw| | 0.7 | 1.0 | 0.89 | 0.76 | 0.89 |

| Condition | Lower Limit | Upper Limit | 4$^{th}$ Example | 5$^{th}$ Example |
|---|---|---|---|---|
| (1) (d12w/d12t)/|{(fw*ft)^½}/f1| | 2.5 | 4.0 | 2.74 | 3.24 |
| (2) |f2n|/f2 | 0.8 | 1.2 | 0.90 | 0.91 |
| (3) f3/fw | 6.0 | 10.0 | 9.21 | 6.77 |
| (4) V2p | 70 | — | 70.4 | 81.6 |
| (5) Np/|fL1/fw| | 0.7 | 1.0 | 0.72 | 0.95 |

Although the present invention has been described in considerable detail with reference to certain preferred embodiments thereof, other embodiments are possible. For example, at least one of the deflecting prisms P and 30 may be replaced with a reflection mirror which bends an optical path. The deflecting prism P may be arranged at a position other than the position between the negative lenses L1 and L2. The deflecting prism P may be arranged, in the first lens group G1 which is fixed during the changing of power and the focusing, at a position other than the positions described in the above described embodiment. At least one of the deflecting prisms P and 30 may be configured to bend the optical path by an angle different from 90°.

This application claims priority of Japanese Patent Application No. P2010-215642, filed on Sep. 27, 2010. The entire subject matter of the application is incorporated herein by reference.

What is claimed is:

1. A variable power optical system, comprising:
   a first lens group having a negative power, a position of the first lens group being fixed with respect to an image pickup plane;
   a second lens group having a positive power; and
   a third lens group having a positive power,
   the first, the second and the third lens groups being arranged in this order from an object side,
   the first lens group comprising a first deflecting element arranged therein to bend an optical path,
   wherein:
   at least one lens group selected from the first to third lens groups excepting the first lens group are moved to perform changing of power or focusing;
   the first lens group comprises a negative lens, a negative lens and a positive lens arranged in this order from the object side;
   the second lens group comprises a positive lens and a negative lens arranged in this order from the object side;
   the third lens group comprises a positive lens; and
   when d12w (unit: mm) denotes a distance between an image side principal point of the first lens group and an object side principal point of the second lens group at a short focal length end, d12t (unit: mm) denotes a distance between the image side principal point of the first lens group and the object side principal point of the second lens group at a long focal length end, fw (unit: mm) denotes a focal length of the entire variable power optical system at the short focal length end, ft (unit: mm) denotes a focal length of the entire variable power optical system at the long focal length end, and f1 (unit: mm) denotes a focal length of the first lens group, the variable power optical system satisfies a condition:

$$2.5 < (d12w/d12t)/|\sqrt{fw \times ft}/f1| < 4.0 \quad (1).$$

2. The variable power optical system according to claim 1, wherein the variable power optical system satisfies a condition:

$$0.7 < |f2n|/f2 < 1.0 \quad (2)$$

where f2n (unit: mm) denotes a focal length of the negative lens in the second lens group, and f2 (unit: mm) denotes a focal length of the second lens group.

3. The variable power optical system according to claim 1, wherein the variable power optical system satisfies a condition:

$$6 < f3/fw < 10 \quad (3)$$

where f3 (unit: mm) denotes a focal length of the third lens group.

4. The variable power optical system according to claim 1, wherein the variable power optical system satisfies a condition:

$$V2p > 70 \quad (4)$$

where V2p denotes Abbe number with respect to the d-line of the positive lens in the second lens group.

5. The variable power optical system according to claim 1, wherein when Np denotes a refractive index at the d-line of the first deflecting prism in the first lens group G1 and fL1 (unit: mm) denotes a focal length of an object side part of the first lens group with respect to a deflection surface of the first deflecting element, the variable power optical system satisfies a following condition:

$$0.7 < Np/|fL1/fw| < 1.0 \quad (5).$$

6. The variable power optical system according to claim 1, wherein the first deflecting element is a prism.

7. The variable power optical system according to claim 6, wherein the first deflecting element bends the optical path by approximately 90°.

8. The variable power optical system according to claim 1, further comprising a second deflecting element which deflects light passed through the third lens group toward an image pickup device arranged at a predetermined position.

9. The variable power optical system according to claim 8, wherein the second deflecting element is a prism.

10. The variable power optical system according to claim 9, wherein the second deflecting element bends the optical path by approximately 90°.

11. An imaging apparatus, comprising:
a variable power optical system; and
an image pickup device arranged such that a sensor surface of the image pickup device is positioned on an image plane of the variable power optical system,
the variable power optical system comprising:
a first lens group having a negative power, a position of the first lens group being fixed with respect to an image pickup plane;
a second lens group having a positive power; and
a third lens group having a positive power,
the first, the second and the third lens groups being arranged in this order from an object side,
the first lens group comprising a first deflecting element arranged therein to bend an optical path,
wherein:
at least one lens group selected from the first to third lens groups excepting the first lens group are moved to perform changing of power or focusing;
the first lens group comprises a negative lens, a negative lens and a positive lens arranged in this order from the object side;
the second lens group comprises a positive lens and a negative lens arranged in this order from the object side;
the third lens group comprises a positive lens; and
when d12w (unit: mm) denotes a distance between an image side principal point of the first lens group and an object side principal point of the second lens group at a short focal length end, d12t (unit: mm) denotes a distance between the image side principal point of the first lens group and the object side principal point of the second lens group at a long focal length end, fw (unit: mm) denotes a focal length of the entire variable power optical system at the short focal length end, ft (unit: mm) denotes a focal length of the entire variable power optical system at the long focal length end, and f1 (unit: mm) denotes a focal length of the first lens group, the variable power optical system satisfies a condition:

$$2.5 < (d12w/d12t)/|\sqrt{fw \times ft}/f1| < 4.0 \tag{1}$$

12. The imaging apparatus according to claim 11, wherein the variable power optical system satisfies a condition:

$$0.7 < |f2n|/f2 < 1.0 \tag{2}$$

where f2n (unit: mm) denotes a focal length of the negative lens in the second lens group, and f2 (unit: mm) denotes a focal length of the second lens group.

13. The imaging apparatus according to claim 11, wherein the variable power optical system satisfies a condition:

$$6 < f3/fw < 10 \tag{3}$$

where f3 (unit: mm) denotes a focal length of the third lens group.

14. The imaging apparatus according to claim 11, wherein the variable power optical system satisfies a condition:

$$V2p > 70 \tag{4}$$

where V2p denotes Abbe number with respect to the d-line of the positive lens in the second lens group.

15. The imaging apparatus according to claim 11, wherein when Np denotes a refractive index at the d-line of the first deflecting prism in the first lens group G1 and fL1 (unit: mm) denotes a focal length of an object side part of the first lens group with respect to a deflection surface of the first deflecting element, the variable power optical system satisfies a following condition:

$$0.7 < Np/|fL1/fw| < 1.0 \tag{5}$$

16. The imaging apparatus according to claim 11, wherein the first deflecting element is a prism.

17. The imaging apparatus according to claim 16, wherein the first deflecting element bends the optical path by approximately 90°.

18. The imaging apparatus according to claim 11, further comprising a second deflecting element which deflects light passed through the third lens group toward said image pickup device.

19. The imaging apparatus according to claim 18, wherein the second deflecting element is a prism.

20. The imaging apparatus according to claim 19, wherein the second deflecting element bends the optical path by approximately 90°.

* * * * *